(12) United States Patent
Yang et al.

(10) Patent No.: US 11,696,567 B2
(45) Date of Patent: Jul. 11, 2023

(54) MULTIFUNCTIONAL SOFT PET PAW CLEANING CUP AND A MOLD AND METHOD FOR PREPARING THE SAME

(71) Applicant: ZHUHAI HENGQIN SUPER TECHNOLOGY LTD., Zhuhai (CN)

(72) Inventors: Tianle Yang, Zhuhai (CN); Yibao Zeng, Zhuhai (CN)

(73) Assignee: ZHUHAI HENGQIN SUPER TECHNOLOGY LTD., Zhuhai (CN)

( * ) Notice: Subject to any disclaimer, the term of this patent is extended or adjusted under 35 U.S.C. 154(b) by 442 days.

(21) Appl. No.: 16/967,135

(22) PCT Filed: Apr. 9, 2019

(86) PCT No.: PCT/CN2019/081829
§ 371 (c)(1),
(2) Date: Aug. 4, 2020

(87) PCT Pub. No.: WO2020/015392
PCT Pub. Date: Jan. 23, 2020

(65) Prior Publication Data
US 2020/0359599 A1 Nov. 19, 2020

(30) Foreign Application Priority Data
Jul. 18, 2018 (CN) .......................... 201821141455.5

(51) Int. Cl.
*A01K 13/00* (2006.01)
*B29C 33/14* (2006.01)
(Continued)

(52) U.S. Cl.
CPC ............ *A01K 13/001* (2013.01); *B29C 33/14* (2013.01); *B29C 33/302* (2013.01);
(Continued)

(58) Field of Classification Search
CPC .... A01K 13/001; B29C 33/14; B29C 33/302; B29C 43/021; B29C 45/03; B29C 2043/026; B29C 2791/002
See application file for complete search history.

(56) References Cited

U.S. PATENT DOCUMENTS 6,851,391 B1 2/2005 Mulich et al.
7,165,510 B2 * 1/2007 Hakes .................. A61K 9/0041
119/664
(Continued)

FOREIGN PATENT DOCUMENTS

CN 203597218 U 5/2014
CN 108174796 A 6/2018
(Continued)

*Primary Examiner* — Ebony E Evans
(74) *Attorney, Agent, or Firm* — Bayramoglu Law Offices LLC (57) ABSTRACT

A multifunctional soft pet paw cleaning cup includes a cup body made of a soft material. One end of the cup body is an open end. Soft spikes extending towards the center of the cup body are provided on the inner surface of the side wall and/or the inner surface of the bottom wall of the cup body, and the soft spike is made of a soft material. A mold for preparing the paw cleaning cup includes an inner mold core, an outer mold core, an upper mold and a lower mold. The outer mold core has an annular peripheral wall. A first soft spike hole is formed inside the peripheral wall. The inner mold core is provided at the inner side of the outer mold core. The lower mold is located below the outer mold core, and the inner mold core is fixed below the upper mold.

5 Claims, 7 Drawing Sheets (51) Int. Cl.
 *B29C 33/30* (2006.01)
 *B29C 43/02* (2006.01)
 *B29C 45/03* (2006.01)

(52) U.S. Cl.
 CPC ............ *B29C 43/021* (2013.01); *B29C 45/03* (2013.01); *B29C 2043/026* (2013.01); *B29C 2791/002* (2013.01)

(56) References Cited

U.S. PATENT DOCUMENTS

| | | | |
|---|---|---|---|
| D760,371 S * | 6/2016 | Spillman, Jr. | D23/499 |
| 2005/0011467 A1* | 1/2005 | Mulich | A01K 13/001 |
| | | | 119/651 |
| 2006/0185616 A1* | 8/2006 | Leary | A01K 13/001 |
| | | | 119/673 |
| 2014/0060442 A1* | 3/2014 | Ressemann | A61D 5/00 |
| | | | 119/61.5 |
| 2014/0165920 A1* | 6/2014 | Sarty | A01K 7/005 |
| | | | 119/72 |
| 2014/0326193 A1* | 11/2014 | Plummer | A01J 7/04 |
| | | | 119/664 |
| 2014/0352629 A1* | 12/2014 | Surmeli | A01K 13/002 |
| | | | 119/609 |
| 2016/0100551 A1 | 4/2016 | Hanneken | |
| 2017/0000084 A1* | 1/2017 | Joyner | A01K 13/001 |
| 2018/0310527 A1* | 11/2018 | Yang | A01K 13/00 |
| 2019/0029224 A1* | 1/2019 | Murphy | A46B 15/0091 |

FOREIGN PATENT DOCUMENTS

| | | |
|---|---|---|
| CN | 108668941 A | 10/2018 |
| WO | 2013028139 A1 | 2/2013 |

\* cited by examiner

MULTIFUNCTIONAL SOFT PET PAW CLEANING CUP AND A MOLD AND METHOD FOR PREPARING THE SAME

CROSS REFERENCE TO THE RELATED APPLICATIONS

This application is the national phase entry of International Application No. PCT/CN2019/081829, filed on Apr. 9, 2019, which is based upon and claims priority to Chinese Patent Application No. 201821141455.5, filed on Jul. 18, 2018, the entire contents of which are incorporated herein by reference.

TECHNICAL FIELD

The present invention relates to the field of pet products, and more particularly, to a multifunctional soft pet paw cleaning cup and a mold and method for preparing the pet paw cleaning cup.

BACKGROUND

With improvements in peoples' living standards, a growing number of families keep pets. The paws of pets inevitably get dirty outdoors, which transfers to the floor. Pet paw cleaning cups are developed and available on the market as a result.

Currently, a paw cleaning cup in the prior art generally includes a plurality of parts, and has an inner portion made of soft silica gel and an outer portion made of hard plastic, which has a complex structure. Moreover, since different pets have different sizes of paws, it is difficult to ensure a suitable size of the paw cleaning cup. A paw cleaning cup that does not fit the paws of the subject pet cannot provide thorough cleaning.

SUMMARY

Technical Problem

The first objective of the present invention is to provide a multifunctional soft pet paw cleaning cup.

The second objective of the present invention is to provide a mold for preparing the pet paw cleaning cup.

The third objective of the present invention is to provide a method for preparing the pet paw cleaning cup.

Technical Solution

In order to achieve the above-mentioned first objective, the present invention provides a multifunctional soft pet paw cleaning cup, including a cup body made of a soft material. One end of the cup body is an open end. A soft spike extending toward the center of the cup body is provided on the inner surface of the side wall of the cup body and/or the inner surface of the bottom wall of the cup body. The soft spike and the cup body are integrally formed and made of the soft material.

Preferably, each of the side wall and the bottom wall of the cup body is a single-layer structure.

Further, the number of the soft spikes is at least two. The fixed end of each soft spike is secured on the inner surface of the side wall and/or the inner surface of the bottom wall. Free ends of the at least two soft spikes are in contact with each other.

Further, the soft spike includes a plurality of first soft spikes provided on the inner surface of the side wall, and the plurality of first soft spikes are arranged along the circumferential direction of the side wall.

Optionally, the soft spike includes a plurality of first soft spikes provided on the inner surface of the side wall, and the plurality of first soft spikes are arranged along the axial direction of the cup body.

Further, the soft spike includes a plurality of second soft spikes provided on the inner surface of the bottom wall, and the plurality of second soft spikes are arranged along the circumferential direction of the inner surface of the bottom wall.

Further, the length of the first soft spike is greater than the length of the second soft spike.

Further, the inner diameter of the open end of the cup body is smaller than the inner diameter of the closed end of the cup body. Preferably, the inner diameter of the cup body is gradually increased from the open end to the closed end.

Further, a surrounding edge is provided at the open end of the cup body along the circumferential direction of the cup body. Preferably, the surrounding edge is tapered and has a diameter which is gradually increased from the closed end to the open end in the axial direction of the cup body.

Further, a handle is provided at the surrounding edge. Preferably, a through hole is formed at the middle portion of the handle to facilitate hanging.

Further, at least one protrusion is provided on the outer surface of the side wall of the cup body and extends outward from the outer surface of the side wall. Preferably, the cup body is reversible.

In order to achieve the above-mentioned second objective, the present invention provides a mold for preparing the multifunctional soft pet paw cleaning cup, including an inner mold core, an outer mold core, an upper mold and a lower mold. The outer mold core has an annular peripheral wall, and a first soft spike hole is formed inside the peripheral wall. The inner mold core is provided at the inner side of the outer mold core. The lower mold is located below the outer mold core, and the inner mold core is fixed below the upper mold.

Preferably, the lower mold is provided with a bottom wall mold body located uprightly under the outer mold core, and a plurality of second soft spike holes are formed in the bottom wall mold body.

Further, the outer mold core includes a first outer mold core and a second outer mold core. The first outer mold core and the second outer mold core are mated.

Further, the mold further includes a first insert and a second insert. The first insert is radially located at the outer side of the first outer mold core and configured to lock the first outer mold core. The second insert is radially located at the outer side of the second outer mold core and configured to lock the second outer mold core.

In order to achieve the above-mentioned third objective, the present invention provides a method for preparing the soft pet paw cleaning cup using the above-mentioned mold, including: fixing the upper mold above the outer mold core, positioning the inner mold core in the outer mold core, and pouring a raw material into a cavity between the inner mold core and the outer mold core; and after an injection molding or compression molding process and a demolding process are completed, reversing the paw cleaning cup after the paw cleaning cup is cooled.

Advantages

The paws of the pet after an outdoor activity can be cleaned by using the pet paw cleaning cup of the present invention. For example, after an outdoor activity of pets such as a cat, a dog, or the like, the paws of the pet are inserted into the paw cleaning cup, and then the paw cleaning cup is filled with a certain amount of cleaning liquid, such as clear water, water mixed with a cleaning agent, or the like. Since the paw cleaning cup is made of a soft material, users can pinch and press the paw cleaning cup to clean uneven portions of the paws of the pet. Moreover, the paw cleaning cup is provided with a plurality of soft spikes therein, so that the soft spikes can adequately contact the paws to facilitate cleaning the paws thoroughly. Additionally, the soft spikes also provide a massage function for the paws. The paw cleaning cup is made of a soft material and thus can fit into the paws of pets of different sizes. Specifically, the paw cleaning cup made of the soft material may be deformed under external pressure, and can satisfy the demand of cleaning paws of different sizes with the aid of the soft spikes.

In addition, the paw cleaning cup is provided with a large number of soft spikes therein to correspondingly clean different surface areas, portions and shapes of the paws of the pet. The free ends of a part of the soft spikes can be in contact with each other to ensure that the paws of the pet are fully cleaned by the soft spikes, thus achieving a thorough cleaning effect.

The paw cleaning cup has the open end with a relatively small inner diameter and the closed end with a relatively large inner diameter. Thus, in practical use, the paw cleaning cup has a small top and large bottom, when warm water is used as the cleaning liquid in the paw cleaning cup, such design not only has a certain heat preservation performance, but also effectively prevents the cleaning liquid in the paw cleaning cup from overflowing or splashing, thus avoiding a mess to the home environment. A large space is formed at the lower portion of the paw cleaning cup to provide a sufficient cleaning space for the paws of the pet.

The tapered surrounding edge arranged at the open end of the paw cleaning cup not only facilitates inserting the paws of the pet into the paw cleaning cup, but also prevents the cleaning liquid in the paw cleaning cup from overflowing rapidly, thus maintaining the cleanliness and hygiene of the home environment.

A plurality of protrusions are provided on the outer surface of the side wall of the cup body to effectively avoid slip when cleaning the paws of the pet. Besides, when the paw cleaning cup is reversed, the soft spikes face outwards, so that the paw cleaning cup functions as a bath glove and thus can be used for grooming and cleaning the hair of the pet with the aid of the soft spikes.

The side and bottom walls of the paw cleaning cup are both single-layer structures. Thus, the paw cleaning cup has a simple production process, and can be produced using a simple mold by injection molding or compression molding. The mold of the present invention has a simple structure, whereby the paw cleaning cup can be manufactured easily, and particularly can be formed by one-step molding, thus reducing the production cost of the paw cleaning cup and achieving high production efficiency of the paw cleaning cup.

After the mold is released, the soft spikes of the paw cleaning cup face outwards. The paw cleaning cup is made of a soft material face and thus is reversible with ease. After being reversed, the paw cleaning cup forms a structure with the soft spikes facing inwards for use. In this way, on the one hand, the paw cleaning cup can be produced easily even when the soft spikes are arranged in the paw cleaning cup; on the other hand, the paw cleaning cup is formed by one-step molding using only one set of molds, which has high production efficiency and a low production cost.

The present invention is further described hereinafter with reference to the drawings and embodiments.

DETAILED DESCRIPTION OF THE EMBODIMENTS

Embodiment of the Multifunctional Soft Pet Paw Cleaning Cup

Figure 1:
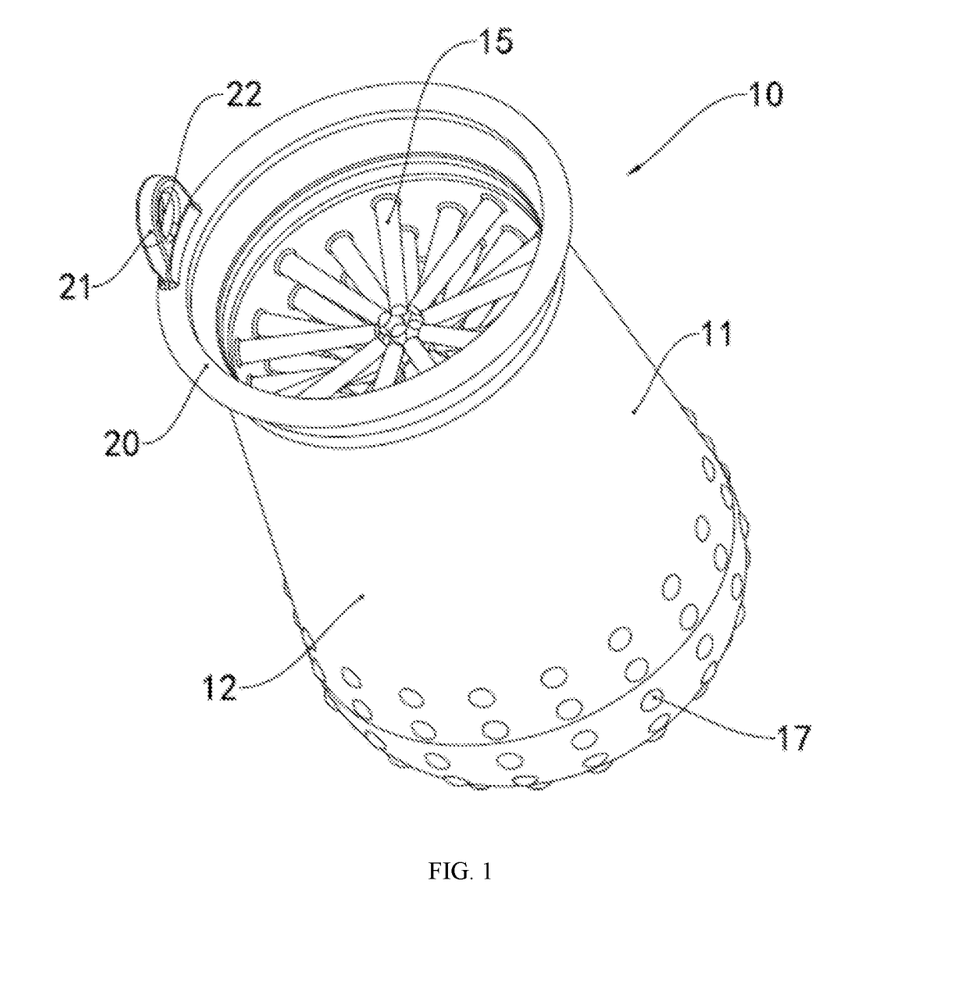
FIG. 1 is a structural view of the multifunctional soft pet paw cleaning cup according to an embodiment of the present invention.

Referring to FIG. 1, the paw cleaning cup 10 of the present embodiment is roughly in the shape of a circular truncated cone with a small top and a large bottom, and the paw cleaning cup 10 includes the cup body 11. Preferably, the cup body 11 is made of a soft material such as silica gel, rubber, thermoplastic rubber (TPR), or the like that have a certain elasticity and good waterproof performance. In addition, the paw cleaning cup of the present embodiment is formed by one-step injection molding or compression molding, which has a simple production process and high production efficiency.

The cup body 11 of the paw cleaning cup 10 is open at one end and closed at the other end. As shown in FIG. 1, the open end is the upper end of the cup body 11, and the closed end is the lower end of the cup body 11. In use, the cup body 11 may be filled with a cleaning liquid such as clear water or water mixed with a cleaning agent. The cup body 11 roughly has a small top and a large bottom. Namely, the open end has a relatively small inner diameter, while the closed end has a relatively large inner diameter, so that a large space is formed at the lower portion of the cup body 11 to facilitate cleaning the paws of the pet. Preferably, the inner diameter of the cup body 11 is changed gradually, and specifically, gradually increased from the open end to the closed end of the cup body 11. Optionally, the lowermost end of the cup body 11 may have a portion with a reduced inner diameter.

The surrounding edge 20 is provided at the open end and extends along the circumferential direction of the open end. The surrounding edge is generally tapered. In the axial direction of the cup body 11, one end of the surrounding edge 20 adjacent to the closed end has a relatively small inner diameter, and the end away from the closed end has a relatively large inner diameter. In other words, the end connected to the open end has an inner diameter smaller than the end that is not connected to the open end. The surrounding edge 20 is configured to not only prevent dirty water from overflowing when cleaning the paws of the pet, but also guide the paws of the pet into the paw cleaning cup 10, which facilitates inserting the paws of the pet into the cup body 11. Additionally, the surrounding edge 20 also functions to prevent dirty water from splashing.

The handle 21 is provided at the surrounding edge 20. The through hole 22 is formed in the middle portion of the handle 21. Users can handily lift the paw cleaning cup 10 by the handle 21. Moreover, users can hang the paw cleaning cup 10 at a hook on a wall via the through hole 22 at the handle 21 to facilitate placing the paw cleaning cup 10.

Figure 2:
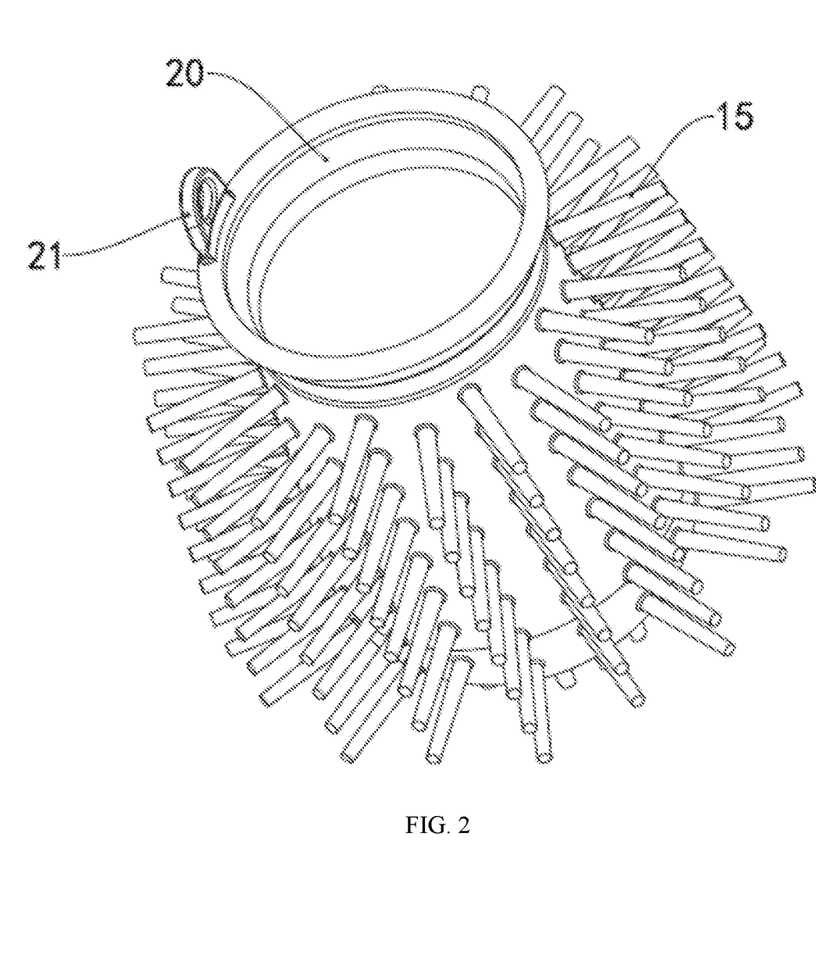
FIG. 2 is a structural view of the reversed multifunctional soft pet paw cleaning cup according to the embodiment of the present invention from the first angle of view.
Figure 3:
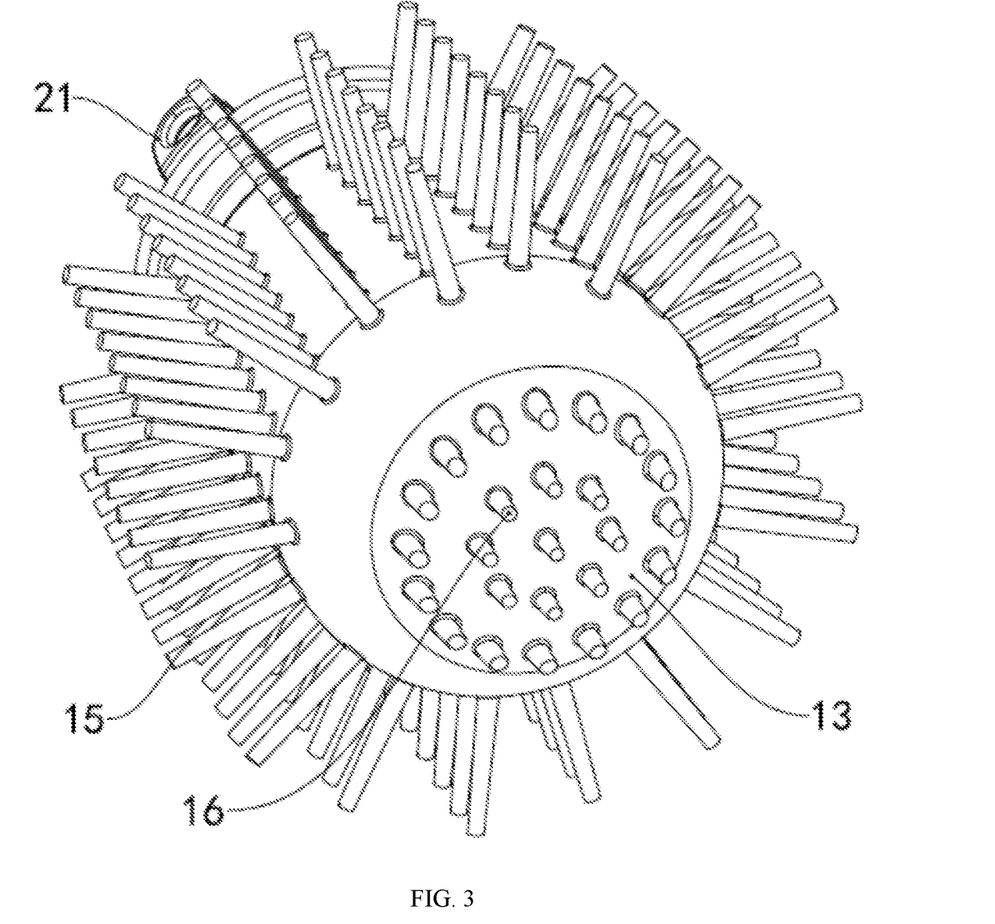
FIG. 3 is a structural view of the reversed multifunctional soft pet paw cleaning cup according to the embodiment of the present invention from the second angle of view.

A plurality of soft spikes are provided in the cup body 11. Referring to FIGS. 2 and 3, when the paw cleaning cup 10 is reversed, the soft spikes located in the paw cleaning cup 10 are exposed outside the cup body 11. The cup body 11 has the side wall 12 and the bottom wall 13. A plurality of first soft spikes 15 are provided on the inner surface of the side wall 12, and a plurality of second soft spikes 16 are provided on the inner surface of the bottom wall 13. Preferably, both the first soft spikes 15 and the second soft spikes 16 are made of a soft material. Specifically, the first soft spikes 15 and the second soft spikes 16 are made of the same material as that of the cup body 11, e.g., silica gel, rubber, TPR, or the like.

The plurality of first soft spikes 15 are arranged in a plurality of rows on the inner surface of the side wall 12, and each row of first soft spikes 15 are arranged along the axial direction of the paw cleaning cup 10. Namely, in the axial direction of the paw cleaning cup 10, each row of first soft spikes 15 includes a plurality of first soft spikes 15 parallel to each other. In addition, the first soft spikes 15 in the plurality of rows are arranged along the circumferential direction of the paw cleaning cup 10, and a circle of first soft spikes 15 are arranged along the circumferential direction of a cross section of the paw cleaning cup 10. Preferably, the first soft spikes 15 are uniformly arranged along the circumferential direction of the paw cleaning cup 10.

Each first soft spike 15 has a fixed end secured on the inner surface of the side wall 12 and a free end extending towards the center of the cup body 11, namely, extending towards the axis of the cup body 11. In addition, as can be seen from FIG. 1, the free ends of a circle of first soft spikes 15 at the same cross section may be in contact with each other to ensure that the plurality of first soft spikes 15 are in adequate contact with the paws of the pet, thus achieving a more thorough cleaning effect. Optionally, the plurality of first soft spikes 15 in the paw cleaning cup 10 may have an equal length or have different lengths, which does not affect the implementation of the present invention. Preferably, the plurality of first soft spikes 15 have an equal length.

A plurality of second soft spikes 16 are provided on the bottom wall 13 of the cup body 11. As can be seen from FIG. 1 and FIG. 3, the length of the second soft spike 16 is smaller than the length of the first soft spike 15, and the second soft spikes 16 extend from the inner surface of the bottom wall 13 towards the center of the cup body 11, namely, towards the open end. Preferably, the plurality of second soft spikes 16 may be arranged on the bottom wall 13 along the circumferential direction of the cup body 11 to form a plurality of circles of second soft spikes 16.

In the present embodiment, each of the side wall 12 and the bottom wall 13 of the paw cleaning cup 10 is a single-layer structure, so that the paw cleaning cup 10 can be conveniently reversed, namely, from a state shown in FIG. 1 to a state shown in FIG. 2. When in the state shown in FIG. 1, the paw cleaning cup 10 has a paw cleaning function, and the paws of the pet can be cleaned after being inserted into the paw cleaning cup. Compared with traditional paw cleaning cups that clean the paws of the pet only by rotating the paw cleaning cup, in the soft paw cleaning cup 10 of the present embodiment, the paws may be cleaned not only by rotating the paw cleaning cup 10, but also by manually pinching and pressing the side wall 12 or bottom wall 13 of the paw cleaning cup 10. When the user manually presses the side wall 12 or bottom wall 13, the first soft spikes 15 or second soft spikes 16 rub and clean the paws to provide thorough cleaning for the paws of the pet. When the side wall 12 or bottom wall 13 are pressed manually, this also provides a massage for the paws of the pet. Moreover, the paw cleaning cup 10 is made of a tactile material, and the soft material is safe without causing injuries to the pet.

In order to facilitate pressing the paw cleaning cup 10 by the user, a plurality of protrusions 17 are provided at the outer surface of the side wall 12 and extend outward from the outer surface of the side wall 12. Preferably, the protrusion 17 is spherical cap-shaped and is also made of a soft material. In this way, when the paws of the pet are cleaned, these protrusions 17 function to be slip resistant to prevent the paw cleaning cup from slipping out of the hands. On the other hand, when the paw cleaning cup 10 is reversed, the protrusion 17 is located inside the cup body, at this time, the paw cleaning cup 10 may function as a bath glove to groom and clean hair of the pet with the aid of the soft spikes, and the protrusions 17 function to be slip resistant to prevent the paw cleaning cup 10 from slipping out of fingers.

In the present embodiment, the paw cleaning cup 10 is made of the soft material and thus has a certain elasticity. When the size of the open end of the paw cleaning cup 10 is smaller than the size of the paws of the pet, the paws can stretch the open end of the paw cleaning cup 10 and thus can be placed into the paw cleaning cup 10. The smaller the gap between the paws of the pet and the open end of the paw cleaning cup 10, the better the anti-overflow function.

When reversed into the state shown in FIG. 2, the paw cleaning cup 10 can function as a pet hairbrush, for example, for bathing the pet. Thus, the paw cleaning cup in the present embodiment has two different functions to endow the paw cleaning cup with multiple uses. Users only need to use one product to achieve the functions of the two existing products, thus saving users the cost of purchasing the two products.

When the paw cleaning cup 10 is reversed into the state shown in FIG. 2, the plurality of first soft spikes 15 and second soft spikes 16 are exposed outside the cup body 11. At this time, the user can stretch out a hand into the cup body, and use the first soft spikes 15 and second soft spikes 16 as bristles to groom the hair of the pet. A cleaning agent may be applied on the soft spikes to clean the pet so that the paw cleaning cup 10 functions as a hairbrush for cleaning the pet.

Embodiment of the Production Mold

Since the plurality of soft spikes are provided in the cup body 11 of the paw cleaning cup 10, if the paw cleaning cup 10 is directly produced according to the state of the paw cleaning cup 10 in use, it is difficult to release the mold, and the resulting air traps cause the problems of uncured material and incomplete filling. Therefore, the paw cleaning cup is produced according to the reversed state.

Figure 4:
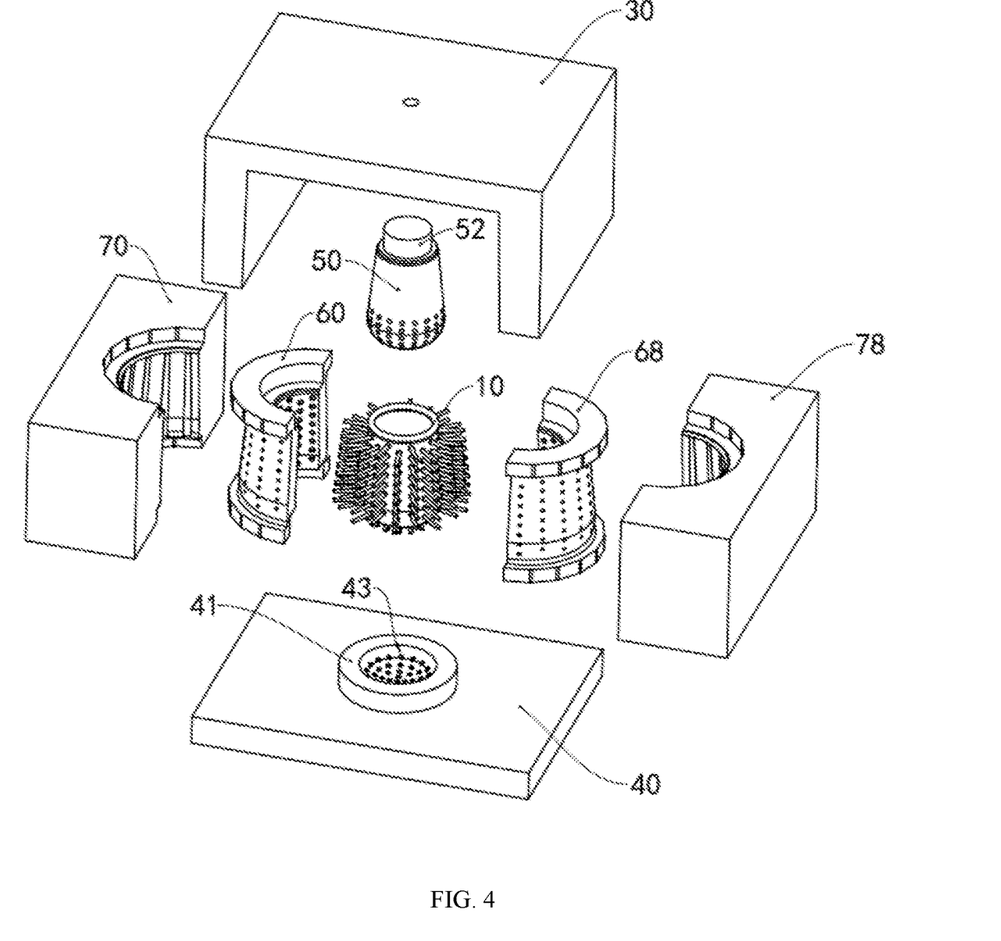
FIG. 4 is an exploded view showing the structures of the multifunctional soft pet paw cleaning cup and the production mold thereof according to an embodiment of the present invention.

Referring to FIG. 4, the production mold of the paw cleaning cup 10 includes the upper mold 30 and the lower mold 40. The outer mold core and the inner mold core 50 are provided between the upper mold 30 and the lower mold 40. The outer mold core includes the first outer mold core 60 and the second outer mold core 68. Two inserts including the first insert 70 provided at the outer side of the first outer mold core 60 and the second insert 78 provided at the outer side of the second outer mold core 68 are provided at the outer side of the outer mold core. The two inserts correspondingly fix the respective outer mold cores.

Figure 5:
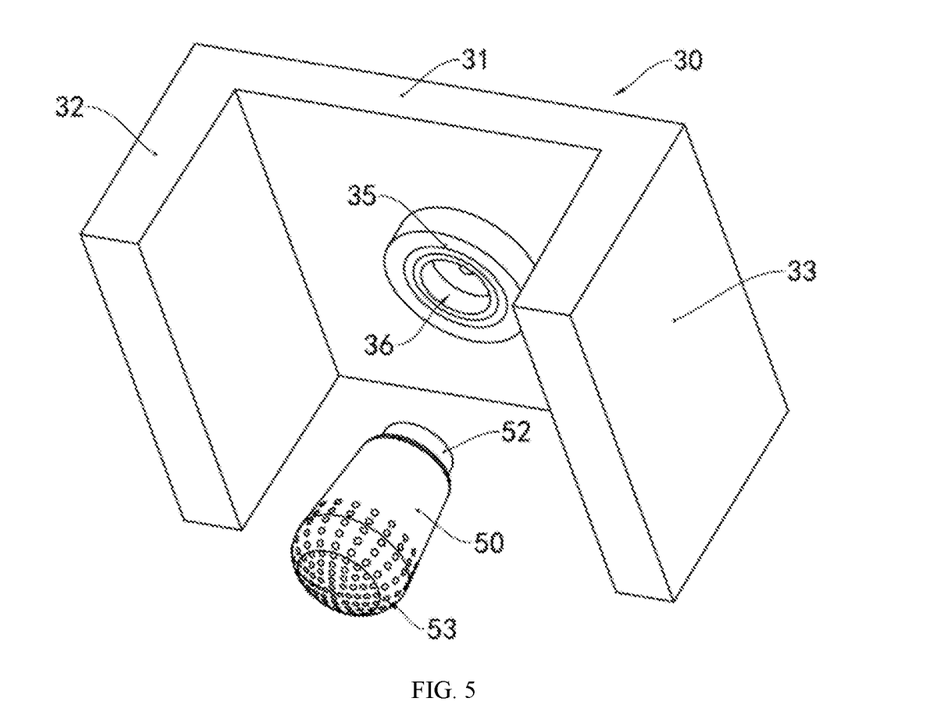
FIG. 5 is an exploded view showing the structures of the upper mold and the inner mold core in the production mold of the multifunctional soft pet paw cleaning cup according to the embodiment of the present invention.

Referring to FIG. 5, the upper mold 30 has the top wall 31 and two side walls 32, 33 provided at two sides of the top wall 31. The fixing portion 35 is provided at the lower surface of the top wall 31 and substantially in an annular shape. The mounting cavity 36 is provided at the middle portion of the fixing portion 35. The circular protrusion 52 is provided at the upper end of the inner mold core 50 and can be mounted into the mounting cavity 36. Preferably, the inner mold core 50 may also be fixed to the top wall 31 of the upper mold 30 by screws, pins, or the like. Optionally, the protrusion 52 may also be in interference fit with the inner wall of the mounting cavity 36 to fix the inner mold core 50 below the upper mold 30.

The inner mold core 50 is in the shape of a circular truncated cone with a small top and a large bottom. A plurality of concave holes 53 are formed on the surface of the lower end of the inner mold core 50. During injection molding, the raw material enters the concave holes 53 to form the protrusions 17 on the outer surface of the side wall. The outer mold core is located below the top wall 31 of the upper mold 30 and at the outer side of the inner mold core 50. When the first outer mold core 60 and the second outer mold core 68 are mated, the inner mold core 50 is located inside the outer mold core.

Figure 6:
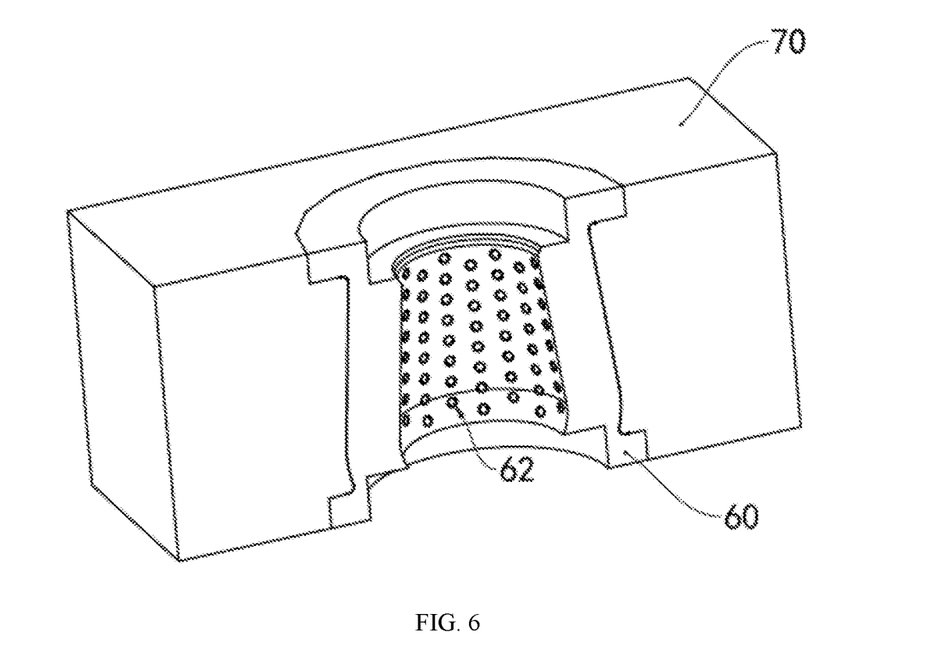
FIG. 6 is a structural view of the outer mold core and the insert in the production mold of the multifunctional soft pet paw cleaning cup according to the embodiment of the present invention.
Figure 7:
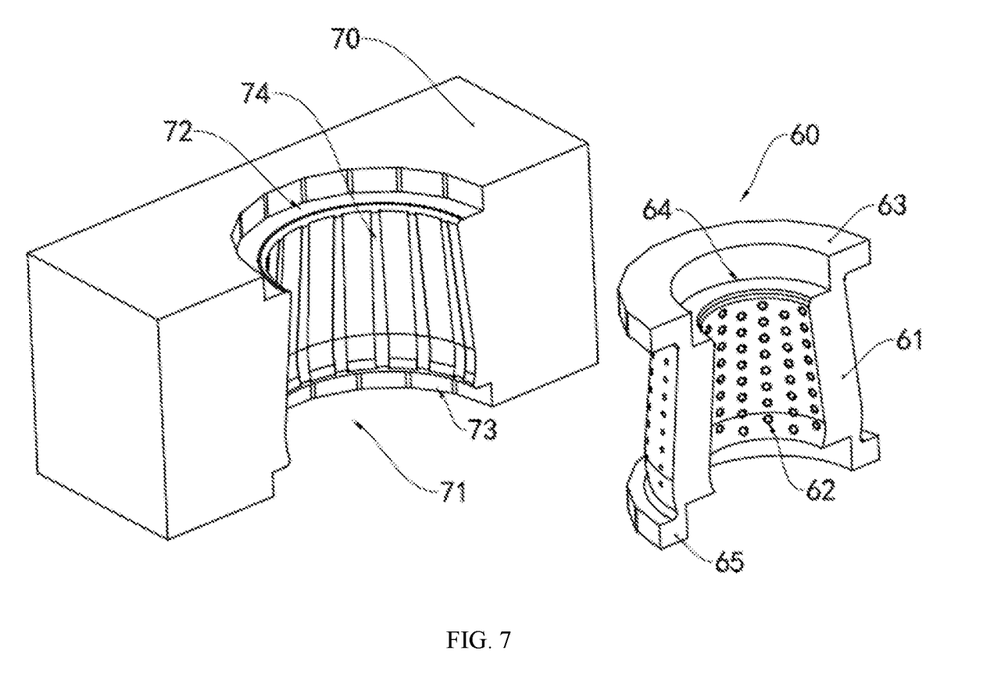
FIG. 7 is an exploded view showing the structures of the outer mold core and the insert in the production mold of the multifunctional soft pet paw cleaning cup according to the embodiment of the present invention.

Referring to FIGS. 6 and 7, the first outer mold core 60 is substantially in the shape of a semi-circular truncated hollow cone, and has the peripheral wall 61. A plurality of first soft spike holes 62 are formed on the peripheral wall 61. The raw material forms the first soft spikes in the first soft spike holes 62 after being poured into the mold cavity. The upper end of the first outer mold core 60 is provided with the first flange 63, and the upper end of the first insert 70 is provided with the first stepped portion 72 matched with the first flange 63. The stepped portion 64 is provided beneath the first flange 63. The lower end of the first outer mold core 60 is provided with the second flange 65, and correspondingly, the lower end of the first insert 70 is provided with the second stepped portion 73 matched with the second flange 65.

The first insert 70 is provided with the cavity 71 matched with the outer contour of the first outer mold core 60. The first outer mold core 60 can be fixed in the cavity 71 in conjunction with the positioning between the first flange 63 and the first stepped portion 72 as well as the positioning between the second flange 65 and the second stepped portion 73, so as to lock the first outer mold core 60 in the first insert 70.

The second outer mold core 68 has the same structure as that of the first outer mold core 60, and the second insert 78 has the same structure as that of the first insert 70, which are not repeatedly described herein.

The lower mold 40 is located below the outer mold core, and the bottom wall mold body 41 is provided at the middle portion of the lower mold 40. Preferably, the bottom wall mold body 41 is located uprightly under the outer mold core, and a plurality of second soft spike holes 43 are formed in the bottom wall mold body 41 and configured to form the second soft spikes 16 of the paw cleaning cup 10.

Embodiment of the Production Method

When the paw cleaning cup is produced using the above-mentioned mold, the inner mold core 50 is firstly fixed below the upper mold 30. Then, the first outer mold core 60 is fixed on the first insert 70, and the second outer mold core 68 is fixed on the second insert 78. After the first second insert 70 and the second insert 78 are mated, the first outer mold core 60 and the second outer mold core 68 are mated accordingly. The upper mold 30 is placed on the first insert 70 and second insert 78, so that the inner mold core 50 is inserted into the cavity formed by the outer mold core. Finally, the upper mold 30 and the two inserts are placed on the lower mold 40 to complete the assembly of the mold.

After that, the raw material is poured into the mold and fills the space between the inner mold core 50 and the outer mold core to form a plurality of first soft spikes 15 in the first soft spike holes 62, and form a plurality of second soft spikes 16 in the second soft spike holes 43. After the paw cleaning cup 10 is cooled and the mold is released, the product is formed, as shown in FIG. 2. Finally, the cooled product is reversed to form the paw cleaning cup 10 shown in FIG. 1.

It can be seen that the paw cleaning cup 10 of the present embodiment adopts a reversible design. When the mold is designed, the whole product is reversed, so that the soft spikes are arranged outwards, which solves the problem that the paw cleaning cup cannot be produced when the soft spikes face inwards. Preferably, a plurality of exhaust grooves 74 are provided on the inner wall of the cavity 71 of the first insert 70, and the first soft spike holes 62 of the first outer mold core 60 are through holes and connected to the exhaust grooves 74. In this way, in the injection molding process, gas in the mold cavity can be exhausted into the exhaust grooves 74 through the first soft spike holes 162 and then exhausted out of the mold through the exhaust grooves 74, which solves the exhaust problem in the production process. In this arrangement, the problems such as incomplete filling of rubber and uncured rubber caused by the gas trapped in the mold can be avoided in the molding process of the soft spikes during the production process. After the paw cleaning cup is formed by injection molding and cooled, the upper mold 30 is separated from the lower mold 40. Preferably, before the upper mold 30 is separated from the lower mold 40, the screws connecting the upper mold 30 and the inner mold core 50 are unscrewed, and the inner mold core 50 is not taken out when the upper mold 30 is taken out.

Then, the first insert 70 is separated from the second insert 78, the first outer mold core 60 is then separated from the second outer mold core 68. Finally, the inner mold core 50 is removed from the paw cleaning cup 10 to remove the molded product. The molded paw cleaning cup 10 has the shape shown in FIG. 2, and therefore, the paw cleaning cup 10 needs to be reversed to form the shape shown in FIG. 1.

It can be seen that the paw cleaning cup 10 can be formed only using one set of molds by one-step injection molding or compression molding. Thus, the cup body 11, the plurality of soft spikes and the protrusions 17 formed on the side wall 12 are all made of the same material by injection molding, e.g., a soft material such as silica gel, or the like. The paw cleaning cup 10 has a simple production process, high production efficiency and low production cost.

Optionally, the paw cleaning cup can be formed by injection molding or compression molding. The soft spike and the cup body are formed by one-step molding and made of the same soft material.

Finally, it should be noted that the above description is only the preferred embodiments of the present invention and not intended to limit the present invention, and various changes and modifications may be made by those skilled in the art. Any changes, equivalent replacements, improvements, and the like made within the spirit and principle of the present invention shall fall within the scope of protection of the present invention.

INDUSTRIAL APPLICABILITY

The soft pet paw cleaning cup of the present invention is configured to clean the paws of pets such as cats, dogs, or the like. A plurality of soft spikes are provided in the paw cleaning cup and the cup body of the paw cleaning cup is made of a soft material such as silica gel, or the like, so that users may pinch and press the paw cleaning cup manually to clean paws of pets of different sizes.

Additionally, the paw cleaning cup is reversible, and thus can achieve a paw cleaning function when the soft spikes are inside, and can function as a hairbrush for bathing pets when the soft spikes are outside, thus endowing the paw cleaning cup with multiple uses.

What is claimed is:

1. A mold for preparing a multifunctional soft pet paw cleaning cup comprising:
    an inner mold core,
    an outer mold core,
    an upper mold, and
    a lower mold; wherein
    the outer mold core has an annular peripheral wall; a first soft spike hole is formed inside the annular peripheral wall;
    the inner mold core is provided at an inner side of the outer mold core;
    the lower mold is located below the outer mold core; and
    the inner mold core is fixed below the upper mold; wherein
    the multifunctional soft pet paw cleaning cup comprises a cup body; wherein
    the cup body is made of a soft material, and one end of the cup body is an open end; a soft spike extending towards a center of the cup body is provided on an inner surface of a side wall of the cup body and/or an inner surface of a bottom wall of the cup body; and the soft spike is made of the soft material and the cup body is reversible.

2. The mold according to claim 1, wherein,
    the lower mold is provided with a bottom wall mold body, wherein the bottom wall mold body is located uprightly under the outer mold core, and at least one second soft spike hole is formed in the bottom wall mold body.

3. The mold according to claim 1, wherein,
    the outer mold core comprises a first outer mold core and a second outer mold core; and the first outer mold core and the second outer mold core are mated.

4. The mold according to claim 3, wherein,
    the first outer mold core comprises a first insert; wherein the first insert is radially located at an outer side of the first outer mold core and configured to lock the first outer mold core; and
    the second outer mold core comprises a second insert; wherein the second insert is radially located at an outer side of the second outer mold core and configured to lock the second outer mold core.

5. A method of preparing the multifunctional soft pet paw cleaning cup using the mold according to claim 1, comprising:
    fixing the upper mold above the outer mold core, positioning the inner mold core in the outer mold core, and pouring a raw material into a cavity between the inner mold core and the outer mold core; and
    after an injection molding process or a compression molding process and a demolding process are completed, reversing the multifunctional soft pet paw cleaning cup after the multifunctional soft pet paw cleaning cup is cooled.

* * * * *